April 25, 1939.                J. J. HARTEN                 2,155,595
                          ROTATABLE CUTTING TOOL
                           Filed May 5, 1937
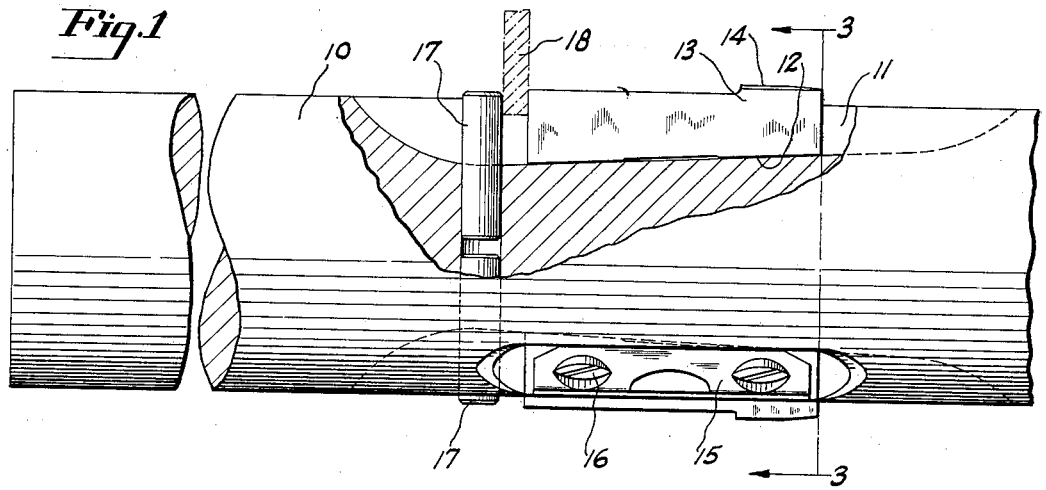
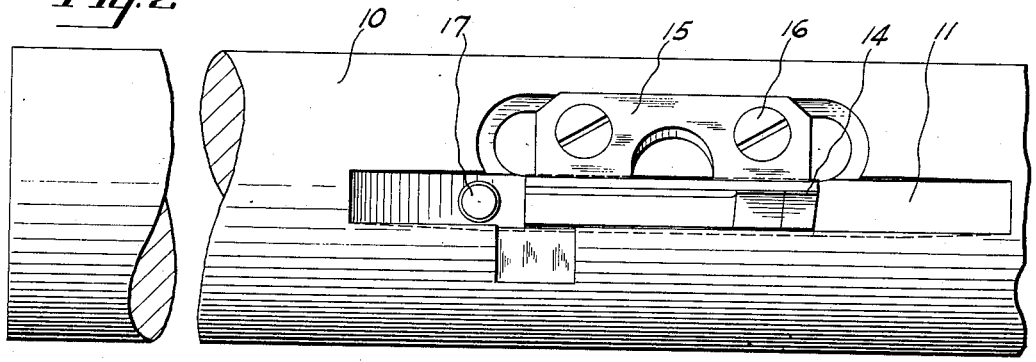
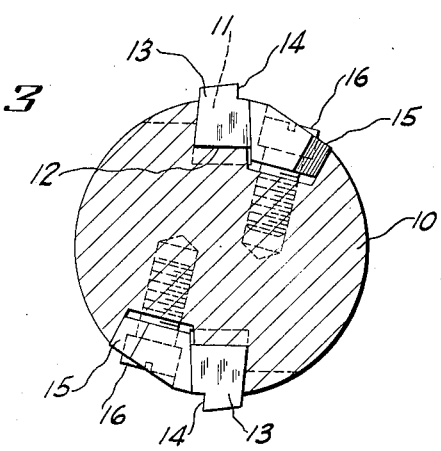
INVENTOR.
John J. Harten
BY Joseph K. Schofield
ATTORNEY Patented Apr. 25, 1939

2,155,595

UNITED STATES PATENT OFFICE 2,155,595

ROTATABLE CUTTING TOOL

John J. Harten, Hartford, Conn., assignor to Niles-Bement-Pond Company, Hartford, Conn., a corporation of New Jersey Application May 5, 1937, Serial No. 140,973

4 Claims. (Cl. 77—58)

This invention relates to rotatable cutters of the inserted blade type adapted to cut holes of predetermined precise diameters in metal such as iron and steel.

An object of the present invention is to provide a rotating cutter such as a reamer or boring bar having a plurality of inserted cutting members which may be adjusted extremely small distances by being moved longitudinally of the reamer or bar within recesses provided within the body member of the tool.

Another object of the invention is to provide simple and improved means for determining the amount of longitudinal movement and consequent radial adjustment of the inserted cutting members when adjusting the tool for different predetermined sizes.

One feature which enables me to accomplish the above-named objects is that the body member of the tool is provided with longitudinally extending recesses, the bottom surfaces of which are carefully finished to a plane and inclined slightly outward toward one end. Another feature of importance is that the cutters are inserted within the recesses so that their radial adjustment will also be varied, the adjustment longitudinally being determined by the distance of one end of the cutting member from a stud or projection extending radially within the recess adjacent one end.

With the above and other objects in view, the invention may include the features of construction and operation set forth in the following specification and illustrated in the accompanying drawing.

In the accompanying drawing annexed hereto and forming a part of this specification, I have shown the invention embodied in an elongated boring bar having diametrically opposed inserted cutting members, but it will be understood that the invention can be otherwise embodied and that the drawing is not to be construed as defining or limiting the scope of the invention, the claims appended to this specification being relied upon for that purpose.

In the drawing:

Figure 1 is a longitudinal view of a portion of a boring bar having the improved form of adjustable inserted cutting members mounted therein, a portion of the bar being broken away.

Fig. 2 is a plan view of the boring bar shown in Fig. 1, and

Fig. 3 is a cross sectional view of a boring bar taken upon the plane of line 3—3 in Fig. 1.

In the above-mentioned drawing I have shown but one embodiment of the invention which is now deemed preferable, but it is to be understood that changes and modifications may be made within the scope of the appended claims without departing from the spirit of the invention.

Briefly and in its preferred aspect, the invention may include the following principal parts: First, a body member in the form of an elongated boring bar, reamer or other member adapted to be retained on a fixed axis and rotated by any preferred means; second, recesses cut within said body member extending longitudinally of the bar or body member and having the bottom surface carefully surfaced to a plane and inclined radially in one direction; third, a pin or projection disposed radially of the axis of the body member and extending into the elongated recesses near one end; fourth, inserted cutting members or blades fitting the recesses and having their lower surfaces in contact with the plane inclined surface of the recess; fifth, clamping members preferably in the form of a wedge shaped plate disposed within suitable recesses intercepting the recesses for the inserted blades and adapted to frictionally engage one side of the cutting member or blade.

Referring more in detail to the figures of the drawing, I provide a body member 10 shown in the figures as an elongated boring bar for use in precision boring operations. This bar or body member 10 is provided with elongated recesses 11, there being two recesses shown in the embodiment selected for illustration disposed diametrically opposite each other. These recesses 11 have their lower or inner surfaces 12 carefully surfaced to a perfect plane and inclined slightly radially. Within these recesses 11 are adapted to be fitted cutting members or blades 13 having their lower surfaces directly contacting with the lower or inner surfaces 12 of the recesses 11. The outer or cutting surfaces 14 of these members may be of any desired form for any particular operation for which the cutter may be adapted.

In order to retain the blades 13 in fixed adjusted position within their recesses but permitting longitudinal adjustment of the cutters or blades 13 along the recesses 11 so that the cutting diameter of the rotating tool may be varied, a clamping wedge or plate 15 is provided for retaining each cutter in adjusted position, this having opposite wedge shaped surfaces, one of which is adapted to engage the front face of the cutting member or blade 13 and the opposite face being adapted to bear against the tapered substantially radial surface of a recess therefor. Clamping screws 16 enable this wedge 15 to be firmly forced inwardly to securely lock its cutting blade 13 in adjusted position.

Adjacent one end, preferably the deeper end, of each of the recesses 11 is disposed an outwardly extending pin 17. These pins 17, as shown in the figures of the drawing, extend radially and centrally outwardly relative to their recesses. The projection or pin 17 may act as a stop for a cutting blade 13 and preferably also as a means for determining the adjustment of the cutters 13. Preferably the recess 11 is so tapered that a longitudinal movement of the cutting blade 13 of ten thousandths of an inch will move the blade 13 outwardly one thousandth of an inch. To accurately set the cutters 13, therefore, it is only necessary to insert a gage block 18 between an end of each of the cutting blades 13 and the pin 17 and form the cutting surfaces 14 accurately to their proper shape and to the approximate diameter for which the bar or reamer is indicated to be used. A test hole may then be bored with the cutting blades 13 in this initial position and the variation between the diameter of the hole cut by this cutter 10 and the diameter desired is noted. It is then only necessary to loosen the clamping plates 15 slightly and insert a different gage block 18 of the necessary increased thickness to effect the proper longitudinal adjustment of the blades. The cutting blades 13 after abutting them against the new gage block are then clamped in their newly adjusted position. The adjustment longitudinally of the blades by increasing the distance between the end surface of the blades or cutters and pin 17 permits proper and extremely small outward or radial movement of the cutting blade 13. After one or several adjustments and trials have been made the blades 13 can be again finally locked in place by the clamping screws 16 and the boring bar or cutting tool will then be in properly adjusted position for precisely the predetermined diameter.

What I claim is:

1. A rotatable cutter comprising in combination, a body member having longitudinally extending and inclined recesses, fixed projections within said recesses adjacent an end thereof, cutting members fitting within said recesses, said members having an end face adjacent a projection, and securing means for said members whereby said members may be clamped in adjusted positions within said recesses with their end faces at predetermined distances from said projections.

2. A rotatable cutter comprising in combination, a body member having longitudinally extending and inclined recesses, fixed projections extending radially within said recesses adjacent an end thereof, cutting members fitting within said recesses, securing means for said members whereby said members may be clamped in predetermined longitudinally adjusted positions within said recesses, and means to determine the distance of the end faces of said members from said projections.

3. A rotatable cutter comprising in combination, a body member having longitudinally extending and inclined recesses, fixed projections extending radially within said recesses adjacent an end thereof, cutting members fitting within said recesses and adjustable longitudinally toward and from said projections whereby positioning means for said members comprising blocks of varying thickness may be interposed between said projections and the ends of members to determine their longitudinal positions, and securing means for clamping said members in predetermined longitudinally adjusted positions within said recesses.

4. A rotatable cutter comprising in combination, a body member having longitudinally extending and inclined recesses having plane bottom surfaces, fixed projections extending radially within said recesses adjacent an end thereof, cutting members longitudinally movable toward and from said projections within said recesses and having their lower surfaces in contact with the plane surface of said inclined recesses whereby adjusting means for said members comprising blocks of varying thickness may be interposed between said projections and the ends of members to determine their longitudinal positions, and securing means for said members whereby said members may be clamped in predetermined longitudinally adjusted positions within said recesses.

JOHN J. HARTEN.